United States Patent
Den Boer et al.

(10) Patent No.: US 9,109,944 B2
(45) Date of Patent: Aug. 18, 2015

(54) METHOD AND SYSTEM FOR ENHANCING THE SPATIAL RESOLUTION OF A FIBER OPTICAL DISTRIBUTED ACOUSTIC SENSING ASSEMBLY

(75) Inventors: Johannis Josephus Den Boer, Rijswijk (NL); Andre Franzen, Rijswijk (NL); Alex Groen, Rijswijk (NL); Daniel Joinson, Rijswijk (NL); Arthur Alexander Van Rooyen, Rijswijk (NL)

(73) Assignee: Shell Oil Company, Houston, TX (US)

( * ) Notice: Subject to any disclaimer, the term of this patent is extended or adjusted under 35 U.S.C. 154(b) by 537 days.

(21) Appl. No.: 13/518,012

(22) PCT Filed: Dec. 22, 2010

(86) PCT No.: PCT/EP2010/070495
§ 371 (c)(1),
(2), (4) Date: Jun. 21, 2012

(87) PCT Pub. No.: WO2011/076850
PCT Pub. Date: Jun. 30, 2011

(65) Prior Publication Data
US 2012/0255362 A1 Oct. 11, 2012

(51) Int. Cl.
*G01H 9/00* (2006.01)
*G01V 8/10* (2006.01)

(52) U.S. Cl.
CPC ........ *G01H 9/004* (2013.01); *G01V 2210/1429* (2013.01)

(58) Field of Classification Search
CPC ....................... G01H 9/004; G01V 2210/1429
USPC ........................... 73/655, 657, 152.16, 152.58
See application file for complete search history.

(56) References Cited

U.S. PATENT DOCUMENTS

| 4,405,198 | A | * | 9/1983 | Taylor ............................. 385/13 |
| 4,545,253 | A | | 10/1985 | Avicola ........................... 73/655 |
| 6,268,911 | B1 | | 7/2001 | Tubel et al. |
| 6,281,489 | B1 | | 8/2001 | Tubel et al. |
| 6,588,266 | B2 | | 7/2003 | Tubel et al. |
| 6,787,758 | B2 | | 9/2004 | Tubel et al. |
| 7,040,390 | B2 | | 5/2006 | Tubel et al. |
| 7,201,221 | B2 | | 4/2007 | Tubel et al. |
| 7,284,903 | B2 | | 10/2007 | Hartog |
| 7,561,771 | B2 | * | 7/2009 | Jaaskelainen et al. ........ 385/100 |
| 7,668,411 | B2 | | 2/2010 | Davies et al. |

(Continued)

FOREIGN PATENT DOCUMENTS

| GB | 2364380 | 1/2002 | |
| WO | WO0127569 | 4/2001 | ............. G01G 19/03 |

(Continued)

*Primary Examiner* — Laura Martin
*Assistant Examiner* — Rose M Miller

(57) ABSTRACT

The spatial resolution of a fiber optical Distributed Acoustic Sensing (DAS) assembly is enhanced by:
  arranging an optical DAS fiber with a series of contiguous channels that are sensitive to vibration in a U-shaped loop such that substantially parallel fiber sections include pairs of channels that are arranged at least partially side by side;
  transmitting a series of light pulses through the optical fiber and receiving back reflections of said light pulses by a light transmission and receiving assembly; and
  processing the received back reflections such that back reflections stemming from at least one pair of channels that are arranged at least partially side by side are correlated to each other.

20 Claims, 6 Drawing Sheets

(56) References Cited

U.S. PATENT DOCUMENTS

| | | |
|---|---|---|
| 7,740,064 B2 | 6/2010 | McCoy et al. |
| 7,946,341 B2 | 5/2011 | Hartog et al. |
| 7,954,560 B2 | 6/2011 | Mathiszik et al. |
| 2002/0109080 A1* | 8/2002 | Tubel et al. ............... 250/227.14 |
| 2004/0043501 A1 | 3/2004 | Means et al. |
| 2009/0014634 A1 | 1/2009 | Sikora ...................... 250/227.14 |
| 2009/0115607 A1* | 5/2009 | Beinhocker .................. 340/541 |
| 2009/0188665 A1 | 7/2009 | Tubel et al. |
| 2010/0107754 A1 | 5/2010 | Hartog et al. |
| 2010/0207019 A1 | 8/2010 | Hartog et al. |
| 2010/0315630 A1 | 12/2010 | Ramos et al. |
| 2011/0007996 A1* | 1/2011 | Huffman ......................... 385/13 |
| 2011/0044574 A1 | 2/2011 | Strong |
| 2011/0069302 A1 | 3/2011 | Hill et al. |
| 2011/0088462 A1 | 4/2011 | Samson et al. |
| 2011/0088910 A1 | 4/2011 | McCann et al. |
| 2011/0111560 A1 | 5/2011 | Purushothaman et al. |
| 2011/0149688 A1 | 6/2011 | Hill et al. |
| 2011/0185815 A1 | 8/2011 | McCann |
| 2011/0216996 A1 | 9/2011 | Rogers |
| 2011/0280103 A1 | 11/2011 | Bostick, III |
| 2011/0292763 A1 | 12/2011 | Coates et al. |
| 2012/0017687 A1 | 1/2012 | Davis et al. |
| 2012/0018149 A1 | 1/2012 | Fidan et al. |
| 2012/0111560 A1 | 5/2012 | Hill et al. |
| 2012/0127459 A1 | 5/2012 | Handerek |
| 2012/0188533 A1 | 7/2012 | Crickmore et al. |
| 2012/0222487 A1 | 9/2012 | Hill et al. |
| 2012/0226452 A1 | 9/2012 | Hill et al. |
| 2012/0230628 A1 | 9/2012 | Hill et al. |
| 2012/0230629 A1 | 9/2012 | Hill et al. |
| 2012/0255362 A1 | 10/2012 | Den Boer et al. |
| 2013/0061688 A1 | 3/2013 | Hayward |
| 2013/0090867 A1 | 4/2013 | Strong |
| 2013/0100768 A1* | 4/2013 | Lopez et al. ..................... 367/25 |
| 2013/0211726 A1 | 8/2013 | Mestayer et al. |

FOREIGN PATENT DOCUMENTS

| | | | |
|---|---|---|---|
| WO | WO2007049004 | 5/2007 | ............... G08G 1/02 |
| WO | 2010010318 | 1/2010 | |
| WO | 2010034986 | 4/2010 | |
| WO | 2009158630 | 12/2010 | |
| WO | 2010136764 | 12/2010 | |
| WO | 2010136810 | 12/2010 | |
| WO | 2011067554 | 6/2011 | |

* cited by examiner

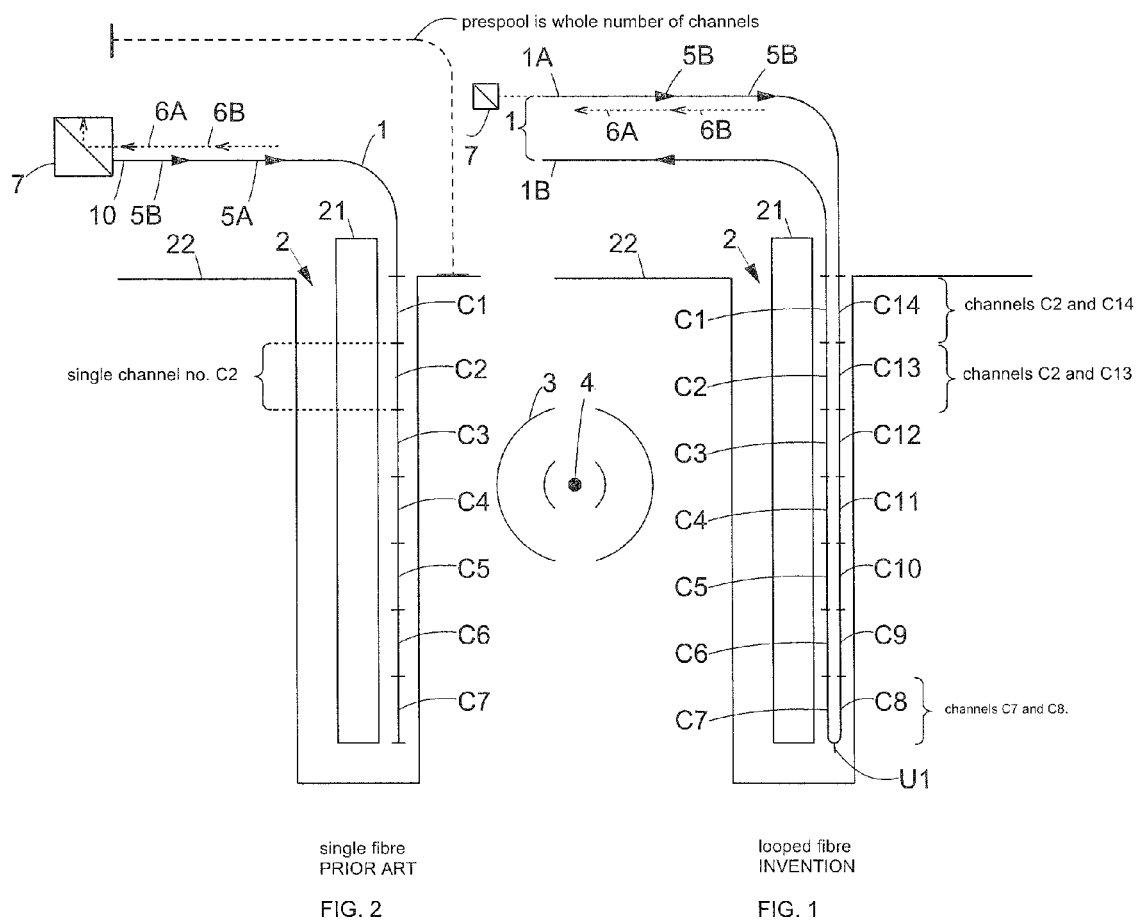

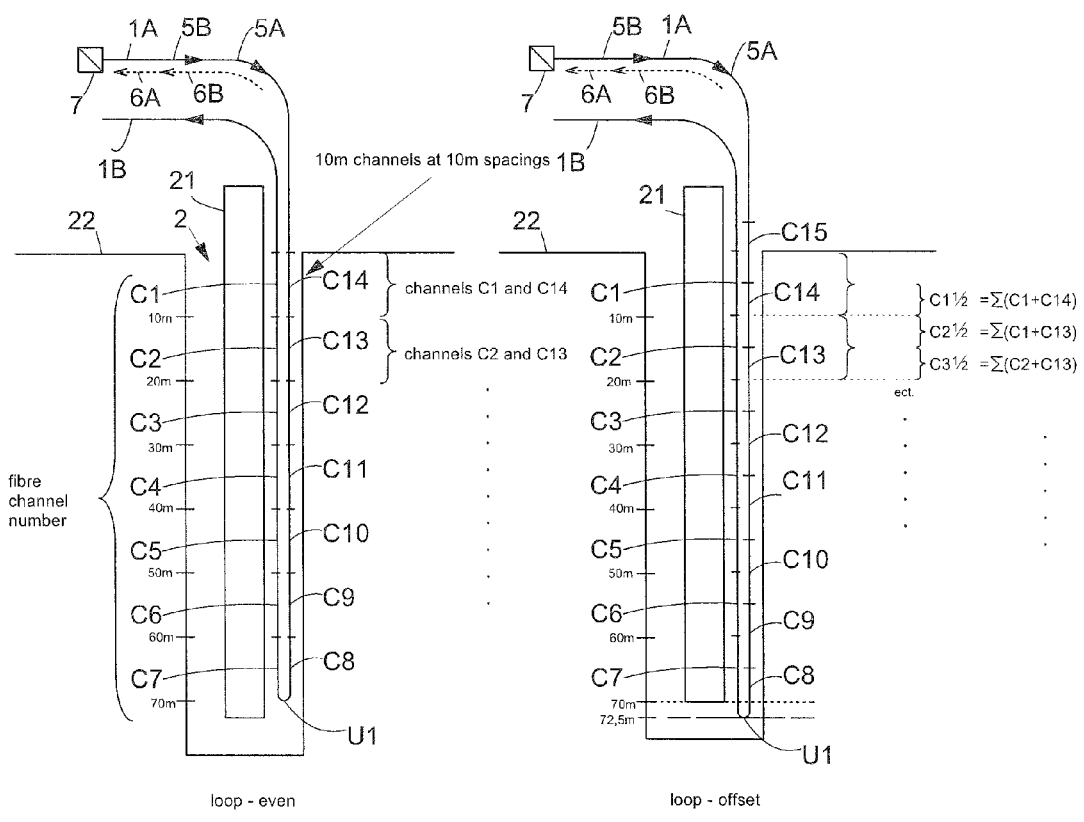
FIG. 3 loop - even
FIG. 4 loop - offset

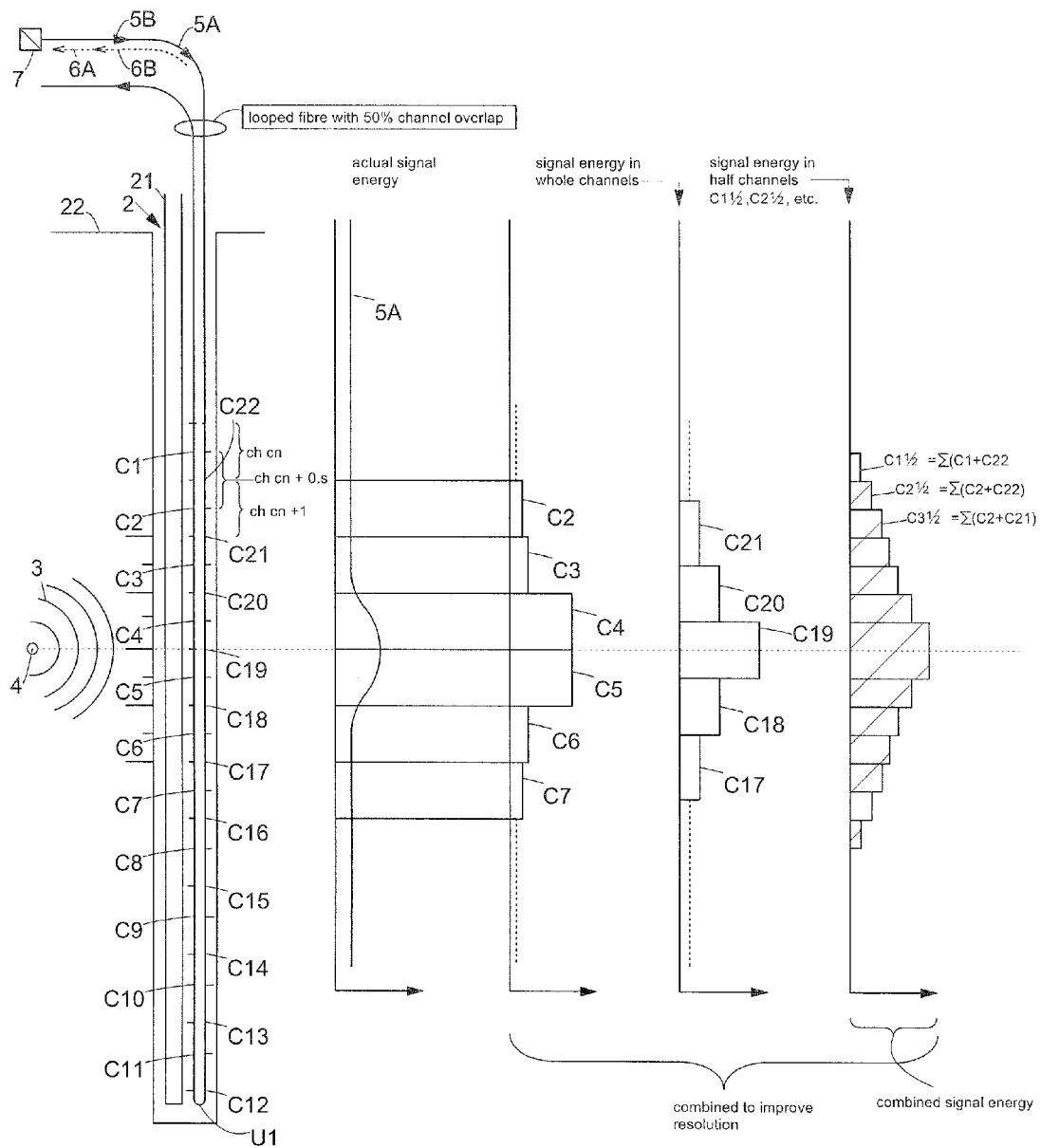

METHOD AND SYSTEM FOR ENHANCING THE SPATIAL RESOLUTION OF A FIBER OPTICAL DISTRIBUTED ACOUSTIC SENSING ASSEMBLY

PRIORITY CLAIM

The present application claims priority from PCT/US2010/070495, filed 22 Dec. 2010, which claims priority from European Application EP 09180657.0, filed 23 Dec. 2009, which are both incorporated herein by reference.

BACKGROUND OF THE INVENTION

The invention relates to a method and system for enhancing the spatial resolution of a fiber optical Distributed Acoustic Sensing (DAS) assembly.

International patent application WO2007/049004 discloses a Distributed Acoustic Sensing (DAS)assembly for sensing and monitoring traffic along several kilometers of the length of a road by means of an fiber optical cable buried alongside the road. In the known DAS assembly a series of light pulses are transmitted through the fiber optical cable by a light transmission and receiving assembly arranged at or near one end of the cable and back reflections of the transmitted light pulses are received by means of an interrogator assembly arranged at or near said end.

Utilising an optical fiber as an acoustic or vibration sensor can be achieved in a number of ways. One method is to launch a pulse of coherent laser light into a fiber. As the pulse travels through the fiber imperfections in the crystal lattice making up the fiber cause light to be reflected back along the fiber and dispersed out of the fiber. Under normal conditions, say for communications purposes, these back reflections are loss terms. However, the nature of the reflection causing imperfections are a function of the strain state of the fiber and as such by measuring the intensity of the back reflections and with multiple pulses it is possible to determine the strain state of the fiber as this varies temporally. Therefore an acoustic or vibration source which changed the strain state of the fiber could be measured using the back reflection data.

The launched laser pulse is precisely timed such that it's length in the fiber is known (10 m is a possible value for the pulse length). Once the pulse is launched the back reflections are measured. The measurement is made with a photodetector, which forms part of a light pulse transmission and receiving assembly and which integrates or adds up the number of photons received in a time period giving a figure relating to the total intensity of back reflected light. The time period can be matched to the laser pulse length and by using multiple contiguous readings will provide a measurement of how the back reflected light varies over the length of the optical fiber. Further by launching laser pulses in close succession and at a fixed rate (for example about 10000 pulses per second) a discretized representation of the change in strain state of the optical fiber as a function of both time and space can be achieved.

It is possible to reduce the length of the laser pulse to 5 m in the fiber. This also allows the spatial resolution to be improved to a 5 m channel spacing. However, the pulse length reduction causes a linear reduction in the energy (half the length=half the energy), which in turn reduces the level of back reflected light and leads to a worsening of the Signal to Noise Ratio(SNR) and therefore sensitivity of the system. There is a need to provide an improved Distributed Acoustic Sensing (DAS) method and assembly with enhanced spatial resolution, which does not reduce the level of back reflected light, the Signal to Noise Ratio (SNR) and/or sensitivity of the DAS method and assembly.

SUMMARY OF THE INVENTION

In accordance with the invention there is provided a method for enhancing the spatial resolution of a fiber optical distributed acoustic sensing (DAS)assembly, the method comprising:
configuring an optical fiber comprising a series of contiguous channels in a U-shaped loop such that the fiber comprises substantially parallel fiber sections with pairs of channels that are arranged at least partially side by side;
inducing a light transmission and receiving assembly to transmit a series of light pulses through the optical fiber and to receive back reflections of the transmitted light pulses reflected by each of the channels; and
processing the received back reflections such that back reflections stemming from at least one pair of channels that are arranged at least partially side by side are correlated to each other.

When used in this specification and claims the term "series of contiguous channels" means that these channels form a succession of fiber segments that are sensitive to acoustic signals or vibration.

Optionally the light transmission and receiving assembly:
transmits a series of light pulses into the fiber, which pulses have each substantially the same duration, such that a length span of each pulse along the length of the fiber is known; and
measures on the basis of time of flight measurement back reflections stemming from each of the channels, which have substantially the same length as the length span of each of the light pulses.

Preferably the channels are arranged along the length of the fiber such that a first channel begins at or near the light transmission and receiving assembly and the U-shaped loop has a mid-point which is located at a distance from with an interface between a pair of adjacent channels and at a distance from a mid-point of a channel, thereby causing the pairs of channels to be partially side by side and to be staggered relative to each other.

It will be understood that if a U-shaped loop has a mid-point that is located at a distance from an interface between a pair of contiguous channels and from a mid-point of a channel, this implies that the mid-point of the U-shaped loop does not coincide with said interface and mid-point such that pairs of channels that are arranged staggered and only partially side by side. The percentage of overlap of such pairs of channels may vary between 1 and 99%.

In accordance with the invention there is further provided a system for enhancing the spatial resolution of a fiber optical distributed acoustic sensing (DAS) assembly, the system comprising:
an optical fiber comprising a series of contiguous channels, which fiber is arranged in a U-shaped loop configuration, such that the fiber comprises substantially parallel fiber sections with channels that are arranged at least partially side by side;
a light transmission and receiving assembly for transmitting a series of light pulses through the optical fiber and for receiving back reflections of the transmitted light pulses reflected by each of the channels; and
means for processing the received back reflections such that back reflections stemming from at least one pair of channels that are arranged at least partially side by side are correlated to each other.

These and other features, embodiments and advantages of the method and/or system according to the invention are described in the accompanying claims, abstract and the following detailed description of non-limiting embodiments depicted in the accompanying drawings, in which description reference numerals are used which refer to corresponding reference numerals that are depicted in the drawings.

BRIEF DESCRIPTION OF THE DRAWINGS

FIG. 1 shows a looped DAS assembly according to the invention;

FIG. 2 shows a prior art DAS assembly with an optical fiber suspended in a single run within a wellbore;

FIGS. 3-5 show various alternative embodiments of DAS assemblies with a looped optical fiber within a wellbore according to the invention;

FIGS. 6A-D shows how optical signal back reflections obtained from staggered channels are combined to enhance the resolution of the DAS assembly shown in FIG. 5;

DETAILED DESCRIPTION OF THE DEPICTED EMBODIMENTS

Figure 7:
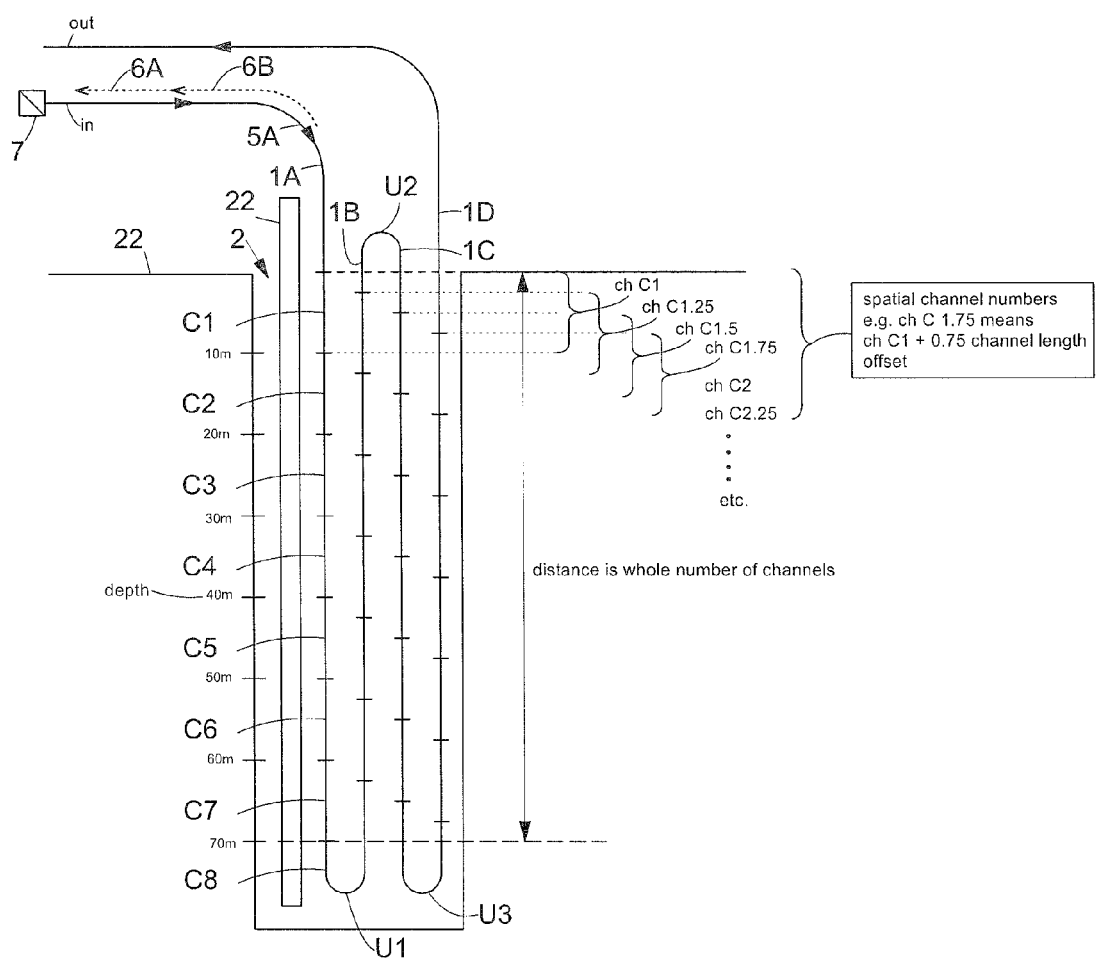
FIGS. 7-11 show various other embodiments of looped DAS assemblies according to the invention.

The method and system according to the present invention improve the spatial resolution of a fiber optical Distributed Acoustic Sensing (DAS) assembly without needing to reduce the length of the launched laser pulse.

In FIGS. 1-11 similar features are identified by similar reference numerals.

FIG. 1 shows a DAS assembly according to the invention, which is based on the insight that one or more loops of fiber 1 are more effective than the conventional single fiber 1 arrangement shown in FIG. 2.

FIG. 2 shows a conventional configuration of a single optical fiber 1 in a wellbore 2 in which a production tubing 21 is suspended from a wellhead (not shown) at the earth surface 22. The single fiber assembly shown in FIG. 2 is configured in accordance with is standard practice by using a single optical fiber 1 with upper and lower end terminations to measure acoustic signals as disclosed in International patent application WO2007/049004, wherein the fiber 1 is divided into a series of contiguous 10 m channels C1-C7 and an acoustic signal 3 transmitted by an acoustic source 4 at a certain location along the length of the fiber 1 are measured by a single channel, for example channel C4. In the known DAS assembly a series of light pulses 5A,5B are transmitted through the optical fiber 1 by a light transmission and receiving assembly 7 arranged at or near a first end 10 of the cable 1. Back reflections 6A,6B of the transmitted light pulses 5A,5B are received by means of a photodetector in the light transmission and receiving assembly 7.

Utilising the optical fiber 1 as an acoustic or vibration sensor can be achieved by launching a series of pulses 5A, 5B of coherent laser light into a fiber 1. As the pulses 5A,5B travel through the fiber 1 imperfections in the crystal lattice making up the fiber 1 cause light to be reflected back along the fiber and dispersed out of the fiber. The nature of the back reflection causing imperfections are a function of the strain state of the fiber and as such by measuring the intensity of the back reflections 6A,6B and with multiple pulses 5A,5B it is possible to determine the strain state of the fiber 1 as this varies temporally. Therefore an acoustic or vibration source 4 which changed the strain state of the fiber could be measured using the back reflection data 6A, 6B.

FIG. 1 depicts an U-shaped looped fiber 1 with two substantially parallel fiber sections 1A and 1B, also referred to as upward and downward fiber runs or legs 1A and 1B, that are connected near the bottom of the well 2 by a single U-bend U1. Light pulses 5A,5B are transmitted into the fiber 1 by a light pulse transmission and receiving assembly 7, which also monitors back reflections 6A,6B of the light pulses 5A,5B that are reflected back when the light pulses travel along the length of the fiber 1. The U-shaped looped fiber configuration shown in FIG. 1 allows the same acoustic signals 3 transmitted by the underground sound source 4 to be measured on two channels C3,C13 at the same time. In this way an average of the signals can be taken and the effective Signal to Noise Ratio (SNR) of the DAS assembly improved. The improved Signal to Noise Ratio (SNR) will also improve the spatial resolution of the DAS assembly.

It is observed that for the purposes of the measurement of acoustic signals 3, all channels C1-C14 can be considered to be sampled simultaneously as the propagation time of the laser pulse 5A, which travels at the speed of light, is much higher than the frequencies of interest in the acoustic signals 3, which travel at the speed of sound.

FIG. 3 shows a DAS assembly comprising a single U-shaped loop U1, which is located at an interface between a pair of adjacent channels C7 and C8. The looped DAS assembly with a pair of substantially parallel downward and upward legs 1A,1B shown in FIG. 3 is substantially similar to that of FIG. 1 and has a U-shaped loop U1 arranged in the well 2 at a depth of about 70 meters below the earth surface.

FIG. 4 shows a DAS assembly comprising a single U-shaped loop U1, which is located at a quarter of the 10 m channel length of channel C8, so that the channels C9-C15 on the downward leg 1A of the fiber 1 will be offset from the channels C1-C7 on the upward leg 1B of the fiber 1. In this embodiment the resolution of the DAS assembly is increased by creating virtual channels $C1/1;2$, $C2/1;2$, $C3/1;2$, etc., which are formed by partial overlaps $C1/1;2=\Sigma(C1+C14)$, $C2/1;2=\Sigma(C1+C13)$, $C3/1;2=\Sigma(C2+C13)$, . . . etc. of adjacent channels C1 and C14, C1 and C13, C3 and C13, . . . etc., centred at 5 m intervals, even though the channel measurement length remains 10 m.

FIGS. 5 and 6A-D show that a 50% overlap of 10 m long channels C1-C22 will improve the ability of the DAS assembly according to the invention to provide spatial discrimination to detect acoustic waves 3 transmitted by an underground sound source 4 at 5 m intervals by creating virtual channels $C1/1;2$, $C2/1;2$, $C3/1;2$, . . . , etc., without requiring modifications to the lasers of the light pulse transmission and receiving assembly 7 or reductions in system performance through SNR considerations.

The left hand diagram in FIG. 6A depicts a pulse input 5A which has a natural energy distribution resulting from acoustic waves 3 emitted by sound source 4 shown in FIG. 5.

The middle diagrams in FIGS. 6B and C show the detection of the pulse input 5A in the whole-spaced and staggered channels C1-C22 of FIG. 5.

The right hand diagram in FIG. 6D shows the detection in the virtual half-spaced channels $C1/1;2$, $C2/1;2$, $C3/1;2$, etc, created by the overlapping portions of the staggered channels C1 and C22, C2 and C22, etc. in accordance with the method according to the invention.

It can be seen in FIG. 6D that by combining the results from the whole and virtual half-spaced channels that additional information regarding the input signal 3 can be obtained, because the virtual half spaced channels $C1/1;2=\Sigma(C1+C22)$, C2/1;2=Σ(C2+C22), C3/1;2=Σ(C2+C21), . . . etc., are centred at 5 m intervals, even though the channel measurement length of each of the whole channels C1 to C22 remains 10 m.

FIG. 7 shows that it is also possible to use the method according to the invention to further increase spatial resolution, such that the spatial resolution is improved from 10 m to 2.5 m by installing the fiber 1 in a zig-zag pattern with three loops U1-U3 which divide the fiber in two downward fiber runs 1A, 1C and two upward fiber runs 1B, 1D.

The length of each loop U1-U3 is equal to ¼ of the channel length. The length of the fiber 1 is also determined to be a whole number (n) of channels C1-Cn. In FIG. 7 the virtual channel numbers C1.25, C1.5, C1.75 mean that these channel numbers measure accumulations of partially overlapping channels C1+0.25Cx, C1+0.5Cy, C1+0.75Cz, etc.

The method according to the invention can be further extended with more fiber runs and different length loops. This follows the basic formula that the fiber runs should be whole numbers of channels long and the loops at the top and bottom should length of the desired overlap of detection, such that:

1/2 spacing=1/2 channel length loop back
1/4 spacing=1/4 channel length loop back
1/8 spacing=1/8 channel length loop back
1/10 spacing=1/10 channel length loop back
1/20 spacing=1/20 channel length loop back.
1/x spacing=1/x channel length loop back.

The ratio 1/x does not need to be a accurately predetermined ratio.

The number of increments is only limited by the range of the optical pulse (up to about 40 or 50 km) and the number of substantially parallel fiber runs 1A-1D that can be installed downhole in a wellbore 2 (5 pairs of substantially parallel fiber runs is fairly standard).

Another feature of the method and system according to the invention is that they can to an extend be reconfigured from surface.

Figure 8:
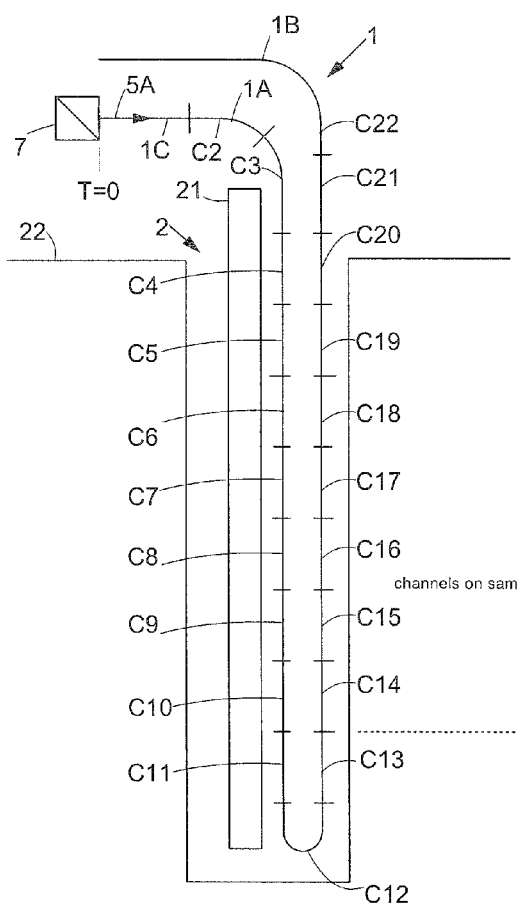

FIG. 8 shows that in the case of a single fiber loop 1A,1B the method is simple and can be achieved synthetically by shifting the channels 1C-22C using the gate timing of the photodetector in the optical signal transmission, receiving and interrogation assembly 7. There are no requirement for distances from the surface to the loop back position in this case. In this situation, the channels are arranged such that they receive signals from the same spatial location. It would be necessary to establish that this situation had been achieved through measurement of the fiber or calibration with a known source. However, once a calibration of channel position had been achieved, it becomes trivial to modify the channel positions as shown in FIG. 9.

Figure 9:
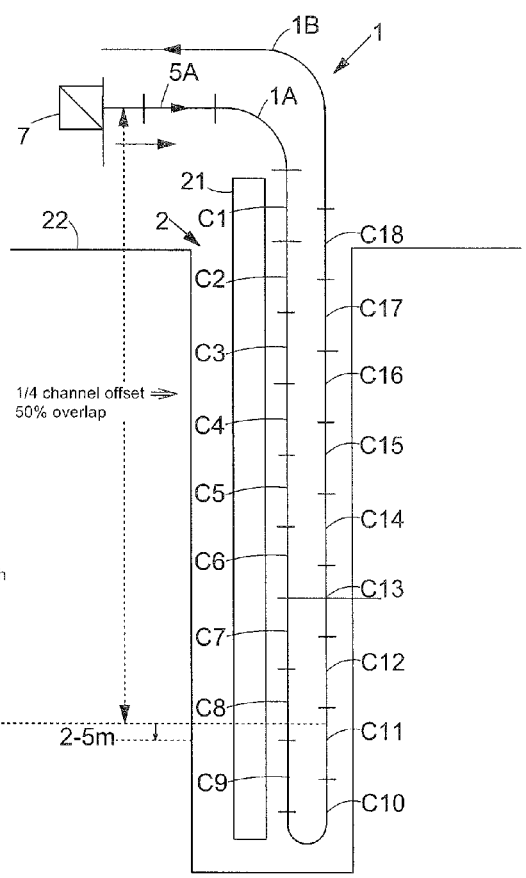

FIG. 9 shows that by offsetting the channel starting position by 2.5 m (through adjustment to the timing of the photodiode sampling), that the channels C1-C18 are switched throughout the fiber 1 from being 100% overlapped to being 50% overlapped. This demonstrates that it is possible to exploit the SNR improvements possible with paired channels C1&C18, C2&C17, etc) when this is required and then reconfigure to the offset channel arrangement shown in FIG. 9 when this is required from surface 22 and without modification to the optical path. It is also possible that noise sources could be tracked by dynamically varying the starting position. This could be used to centre the channels C1-C18 on known acoustic sources such as gas lift injection points or, in the case of flowing fluids, to track in real time slugs of liquid moving through the wellbore 2 and/or production tubing 21.

Figures 10, 11:
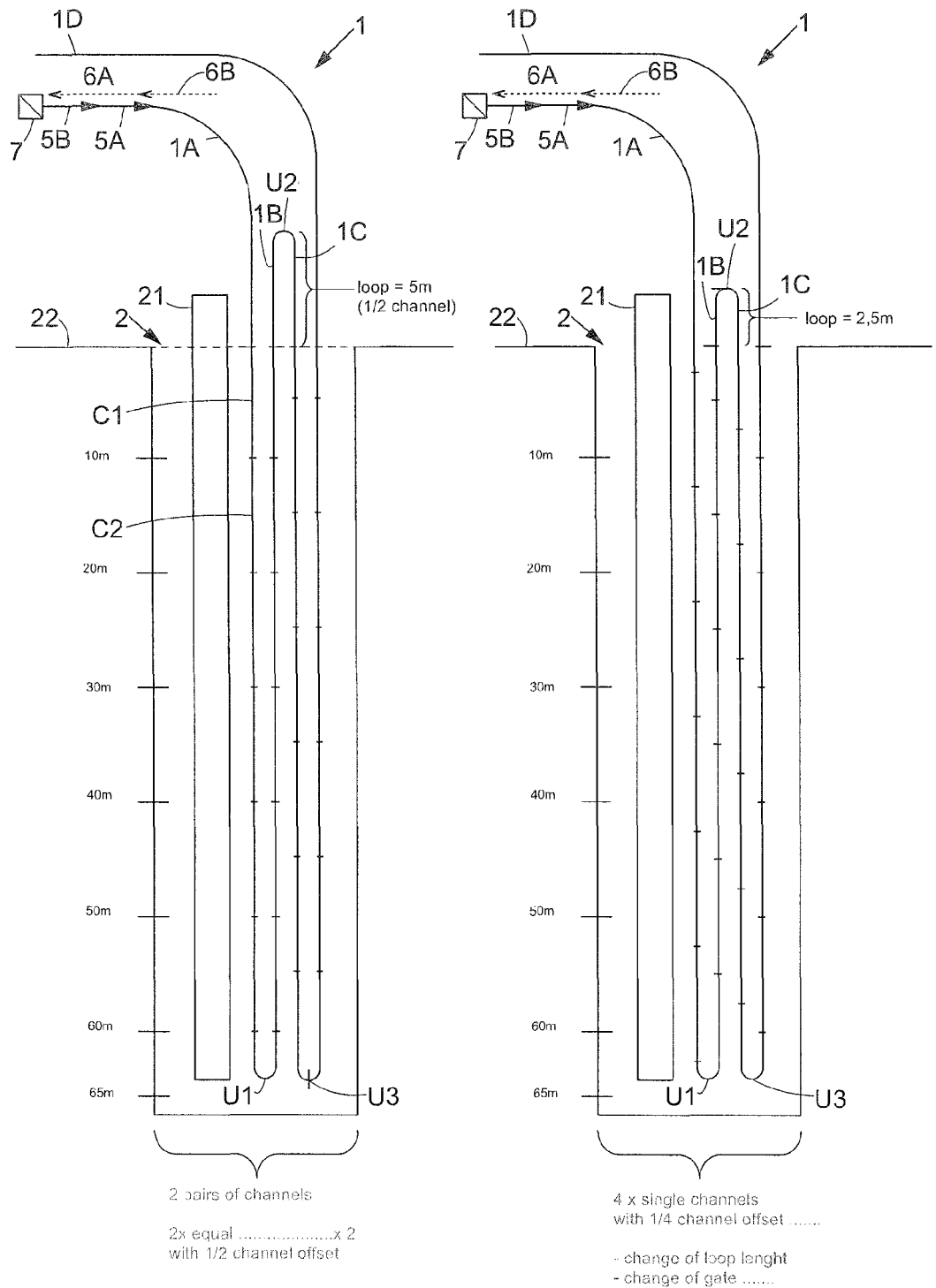

FIGS. 10 and 11 show that with multiple zig-zag fiber loops U1-U4 it is only necessary that the loops U1,U3 at the bottom of the well are of equal distance from the surface, that the fiber runs 1A-1D are a whole number of channel lengths (which can be adjusted from surface) and that the loop U2 at surface 22 is equal to length of the incremental steps (¼ channel length in the case of a 4 fiber run, ¼ channel resolution system).

FIGS. 10 and 11 further show that it is also possible to configure a system of for example four fiber runs 1A-1D and three fiber loops U1-U3 to provide two separate measurements of the same depth with one pair of fiber runs 1A,1B offset from the other 1C,1D by a half channel length. This configuration with four fiber run 1A-1D is shown in FIG. 10 and allows to increase the Signal to Noise Ration (SNR) through averaging of the matched signals as well as doubling the spatial resolution of the DAS assembly 1.

FIG. 11 shows that the DAS assembly 1 shown in FIG. 10 can later be reconfigured at surface to provide ¼ channel spacing simply by reducing the length of the surface loop U2 and altering the timing of the photodetector gate of the light pulse transmission and receiving assembly 7 by a known and predictable amount. This change can be made (and reversed) from the earth surface 22. It is observed that redistribution of sensing channels C1-Cn and/or C1/1;2-Cn/1;2 can only be achieved when these channels C1-Cn and/or C1/1;2-Cn/1;2 are to an extent virtual as is the case here.

It will be understood that there are many alternatives to the embodiments shown in FIGS. 1-11 to increase the Signal to Noise Ration (SNR) and the spatial resolution of a looped DAS assembly 1 according to the invention.

What is claimed is:

1. A method for enhancing the spatial resolution of a fiber optical distributed acoustic sensing assembly, the method comprising:
    configuring an optical fiber comprising a series of contiguous channels in a U-shaped loop such that the fiber comprises substantially parallel fiber sections with pairs of channels that are arranged at least partially side by side;
    inducing a light transmission and receiving assembly to transmit a series of light pulses through the optical fiber and to receive back reflections of the transmitted light pulses reflected by each of the channels; and
    processing the received back reflections such that back reflections stemming from at least one pair of channels that are arranged at least partially side by side are correlated to each other.

2. The method of claim 1, wherein the light transmission and receiving assembly:
    transmits a series of light pulses into the fiber, which pulses have each the same duration, such that a length span of each pulse along the length of the fiber is known; and
    measures on the basis of time of flight measurement back reflections stemming from each of the channels, which have the same length as the length span of each of the light pulses.

3. The method of claim 2, wherein the channels are arranged along the length of the fiber such that a first channel begins at or near the light transmission and receiving assembly and at least one U-shaped loop has a mid-point which is located at a distance from with an interface between a pair of adjacent channels and at a distance from a mid-point of a channel, thereby causing pairs of channels that are arranged at least partially side by side to be staggered relative to each other.

4. The method of claim 3, wherein the optical fiber comprises a single U-shaped loop and the mid-point of the U-shaped loop is arranged such that a first series of contiguous channels distributed along the length of a first fiber run that forms a first leg of the U-shaped loop are staggered with respect to a second series of contiguous channels that are distributed along the length of the second fiber run that forms the other leg of the U-shaped loop and pairs of channels of the first and second series of channels that are arranged at least partially side by side overlap each other by 50%.

5. The method of claim 4, wherein the spatial resolution of the distributed acoustic sensing system is increased to 50% of the channel length, so that if the channel length is between 8 and 12 m, the spatial resolution is increased to between 4 and 6 m.

6. The method of claim 3, wherein:
the optical fiber is arranged in a zig-zag pattern that comprises three fiber sections that are arranged side by side and which fiber runs are interconnected by a first and a second U-shaped loop;
the mid-point of the first U-shaped loop is arranged such that a first series of contiguous channels distributed along the length of the first fiber run are staggered with respect to a second series of channels distributed along the length of the second fiber run;
the mid-point of the second U-shaped loop is arranged such that a third series of channels distributed along the length of the third fiber run are staggered with respect to the first and second series of channels; and
adjacent channels of the first and second series of channels overlap each other by 33%.

7. The method of claim 3, wherein:
the optical fiber is arranged in a zig-zag pattern that comprises n-fiber runs that are arranged side by side and which fiber runs are interconnected by (n−1) U-shaped loops;
n is at least 2; and
the mid-point of the each U-shaped loop is arranged such that the series of channels distributed along the length of each fiber run are staggered with respect to a any series of channels distributed along the length of any other fiber run.

8. The method of claim 1, wherein the optical fiber is arranged in an elongate cavity, each channel has a length between 8 and 12 meters, and the optical fiber has a length less than 50 kilometers.

9. The method of claim 8, wherein the elongate cavity is an underground wellbore used for exploration, observation, production of hydrocarbon fluid from, and/or injection of another fluid into a hydrocarbon fluid containing formation and the method is used to manage and/or control the production of hydrocarbon fluid and/or injection of another fluid into the hydrocarbon fluid containing formation on the basis of measurement of acoustic signals traversing the formation and the wellbore.

10. The method of claim 9, wherein the acoustic signals comprise at least one of the group consisting of seismic signals, electrokinetic signals.

11. The method of claim 10, wherein the acoustic signals comprise noise emitted by hydrocarbon and/or other fluid flowing through the wellbore.

12. The method of claim 11, wherein the acoustic signals comprise noise emitted by fluid and/or fractures propagating through a reservoir of the wellbore.

13. The method of claim 10, wherein the acoustic signals comprise noise emitted by fluid and/or fractures propagating through a reservoir of the wellbore.

14. The method of claim 9, wherein the acoustic signals comprise noise emitted by hydrocarbon and/or other fluid flowing through the wellbore.

15. The method of claim 14, wherein the acoustic signals comprise noise emitted by fluid and/or fractures propagating through a reservoir of the wellbore.

16. The method of claim 9, wherein the acoustic signals comprise noise emitted by fluid and/or fractures propagating through a reservoir of the wellbore.

17. The method of claim 1 wherein the step of processing the received back reflections comprises correlating back reflections stemming from at least one pair of channels that are arranged at least partially side by side wherein accumulating the back reflections stemming from each pair of channels that are arranged at least partially side by side.

18. The method of claim 17, wherein the pairs of channels are arranged partially side by side and staggered relative to each other and the accumulated back reflections are assumed to stem from reflections stemming from virtual channels that have a length equal to overlapping parts of each pair of staggered channels.

19. A system for enhancing the spatial resolution of a fiber optical distributed acoustic sensing assembly, the system comprising:
an optical fiber comprising a series of contiguous channels, which fiber is arranged in a U-shaped loop configuration, such that the fiber comprises substantially parallel fiber sections with pairs of channels that are arranged at least partially side by side;
a light transmission and receiving assembly arranged at or near a first end of the fiber for transmitting a series of light pulses through the optical fiber and for receiving back reflections of the transmitted light pulses reflected by each of the channels; and
means for processing the received back reflections such that back reflections stemming from at least one pair of channels that are arranged at least partially side by side are correlated to each other.

20. The system of claim 19, wherein the fiber comprises a plurality of U-shaped loops and at least three substantially parallel fiber sections that are arranged in a zig-zag pattern, wherein adjacent fiber sections comprise pairs of channels that are arranged partially side by side and staggered relative to each other.

* * * * *